United States Patent Office 2,870,183
Patented Jan. 20, 1959

2,870,183

ORGANO-CHROMIUM COMPOUNDS

John C. Brantley, Snyder, N. Y., assignor to Union Carbide Corporation, a corporation of New York No Drawing. Application September 23, 1953
Serial No. 381,964

3 Claims. (Cl. 260—438)

This invention relates to organo-metallic compounds containing chromium as the metal component.

An object of the invention is to provide organo-metallic compounds containing chromium as the metallic component linked to the organic component by carbon to metal bonds.

Other objects of the invention will in part be obvious and will in part appear hereinafter.

The products of this invention have the general empirical formula:

R—Cr—R where R is a residue of an organic compound containing a five carbon ring, alicyclic in character, which is hereinafter designated an "alicyclic cyclopentadienyl carbon ring" and has the structure:

The alicyclic character of the carbon ring is essential for purposes of this invention. For example, both cyclopentadiene and indene contain an alicyclic cyclopentadienyl ring structure; cyclopentadiene having no double bond coordinately shared with an aromatic ring and indene having only one double bond of the cyclopentadienyl ring coordinately shared with an aromatic ring. In contrast, the five carbon ring in fluorene, where each of the double bonds in such ring is coordinately shared with an aromatic ring, is not alicyclic in character and fluorene thus does not contain an alicyclic cyclopentadienyl ring structure.

Compounds of this invention may be prepared by reacting an alkali metal derivative of an organic compound containing an alicyclic cyclopentadienyl carbon ring with a chromium halide, that process being disclosed and claimed in the co-pending application of Maurice A. Lynch and John C. Brantley, Serial No. 381,970, filed September 23, 1953 and entitled "Process for Producing Organo-metallic Compounds" but forming no part of this invention.

The formation of compounds of this invention may be illustrated by the reaction of sodium cyclopentadiene with chromous chloride according to that process which involves the following reactions:

$$C_5H_6 + Na \rightarrow NaC_5H_5 + 1/2 H_2$$
$$2NaC_5H_5 + CrCl_2 \rightarrow (C_5H_5)_2Cr + 2NaCl$$

$(C_5H_5)_2Cr$ is a reddish-purple compound having a crystalline form. It is easily oxidized and very sensitive to air. At a pressure of about 1 mm. Hg it is volatilized at about 80° C. and consequently may be purified by sublimation under high vacuum.

The compounds of this invention may be employed as coloring agents and as getters for elimination of traces of oxygen from gases.

As illustrative embodiments of a manner in which the invention may be practiced, the following example is presented.

*Example*

The solution of chromous chloride in ethylene glycol dimethyl ether was prepared by placing 5.0 grams of chromium powder and 6.02 grams of $CrCl_3$ in 175 ml. of ethylene glycol dimethyl ether. There was no reaction at room temperature but on refluxing this solution with agitation it became red-violet in color. After four hours at reflux, 5 grams of chromium powder was added and refluxing continued for two hours. Then 2.6 grams of aluminum powder was added and after one additional hour of reflux the solution of $CrCl_2$ was pale green. A solution of $NaC_5H_5$ was prepared by adding 18 ml. of $C_5H_6$ to 2.6 grams of sodium ribbon in 360 ml. of ethylene glycol dimethyl ether. After one hour at room temperature the reaction was complete. This solution was added to the $CrCl_2$ solution at 0° C. with stirring under a protective atmosphere of nitrogen. The reaction mixture was brown and contained a brown solid. The organic soluble portion was filtered under nitrogen and the solvent removed under reduced pressure. The residue from this solvent evaporation was heated to 80° C. in a vacuum sublimation apparatus at 1 mm. Hg and reddish-purple $(C_5H_5)_2Cr$ sublimed onto the cold finger. Since these crystals are very sensitive to air, all transfers were made in a "dry box" under nitrogen. $(C_5H_5)_2Cr$ is soluble in organic solvents but is easily decomposed in solution under oxidizing conditions.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. An organo-chromium compound consisting of chromium and, as the organic component, organic hydrocarbon residues selected from the group consisting of cyclopentadienyl and indenyl, the organic residues and the atoms of chromium in said compound being in the ratio of 2:1.

2. An organo-chromium compound having the formula

R—Cr—R wherein R is an organic hydrocarbon residue selected from the group consisting of cyclopentadienyl and indenyl.

3. Bis-(cyclopentadienyl) chromium.

References Cited in the file of this patent

Kealy et al.: Nature, vol. 168, December 15, 1951, pp. 1039–40.

Wilkinson: J. Am. Chem. Soc., vol. 74, December 5, 1952, pp. 6146–47 (received June 12, 1952).

Wilkinson: J. Am. Chem. Soc., vol. 74, December 5, 1952, pp. 6148–49 (received June 12, 1952).

Fischer et al.; Zeitschrift für Naturforschung, vol. 8, 8b–1–2, January 1953, pp. 1 and 2.

Fischer and Hafner: Zeitschrift für Naturforschung, 8B, 444–445 (1953) (received July 30, 1953).

The Van Nostrand Chemist's Dictionary, D. Van Nostrand Co., Inc. (1953), N. Y.

Wilkinson: J. Am. Chem. Soc., vol. 76, #1, January 5, 1954, pp. 209–211.

Hackh's Chemical Dictionary, Grant, 3rd ed., Blakiston Co., Philadelphia.